Patented Apr. 10, 1928.

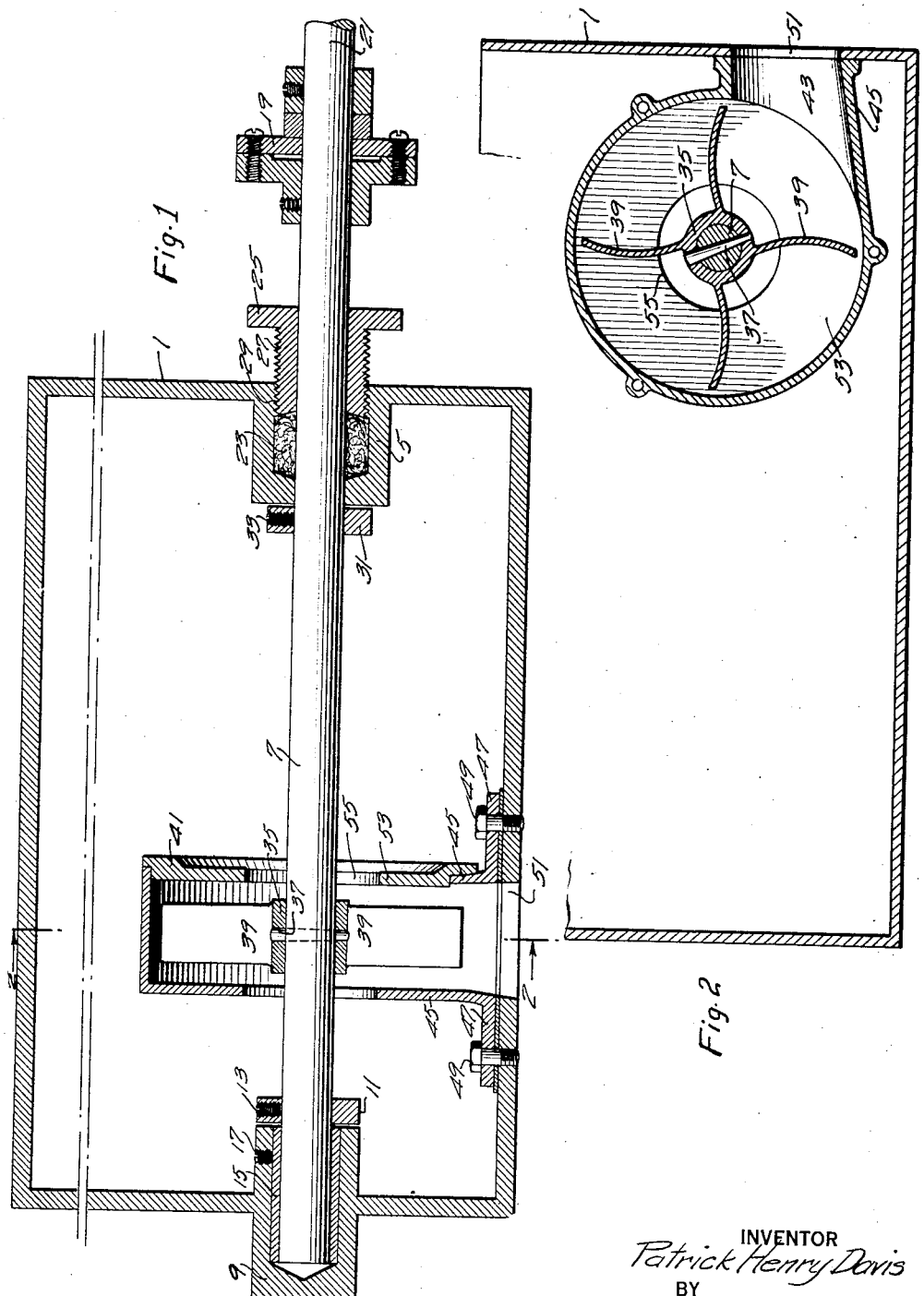

1,665,686

UNITED STATES PATENT OFFICE.

PATRICK HENRY DAVIS, OF LEONIA, NEW JERSEY.

PUMP.

Application filed December 29, 1925. Serial No. 78,154.

This invention relates to improvements in pumps.

One object of the present invention is to provide a pump of the rotary type in which the space usually occupied by the bearings for the rotor shaft is left open with the result that it can be utilized to permit the fluid to be acted upon to freely enter or fall into the pump casing at that point.

A further object of the invention is to provide a pump, more particularly for use in a machine provided with a fluid tank, such, for example, as a dish-washing machine, having a shaft mounted in bearings carried by opposed walls of the tank.

A still further object of the invention is to provide a pump in which the vanes forming the rotor are of such a size that a clearance is left in all directions between their outer edges and the inner surface of the pump casing.

Another object is to provide a pump which will be simple in construction, efficient in operation and low in cost of production.

In order that the invention may be clearly understood an embodiment thereof will now be described with reference to the accompanying drawing in which:—

Figure 1 is a horizontal section of a pump constructed and arranged in a machine according to the present invention, and, Fig. 2 is a transverse section taken on the line 2—2 of Fig. 1.

In the drawing, the reference numeral 1 indicates a tank which, for example, may be that employed in a dish-washing machine.

In opposite walls of the tank 1 are respectively provided bearings 3 and 5 which carry the shaft 7 for the pump.

As will be seen from Fig. 1, the bearing 3 comprises in cross section a rectangularly-shaped, box-like hollow member 9 which may be set into or formed integral with the wall of the tank 1 and is disposed transversely to the plane of said wall. The member 9 is open at its inner end to admit the shaft 7 about which latter is placed, adjacent said open end, a collar 11 adapted to be secured in place on the shaft by means of a set screw 13. The member 9 is lined with a bushing 15 secured against rotation by a set screw 17.

The bearing 5 in the opposite wall of the tank is U-shaped in cross section and is disposed on the inside of the wall of the tank, being preferably formed by indenting, as it were, the wall of the tank so as to provide the desired formation as will be clear from Figure 1. This bearing is of course hollow to accommodate the shaft 7 which, in this instance passes through and beyond the bearing where it is coupled, through a suitable coupling device 19, to a driving shaft 21. The opening in the bearing is made large enough in diameter to permit of the insertion of a packing ring or rings 23 about the shaft 7 and these may be retained in place and compressed if desired by means of a stuffing nut 25 which is provided with an external screwthread 27 adapted to co-operate with similar threads 29 cut in the wall of the tank and extended if desired along the interior surface of the U-shaped member forming the bearing 5, the whole forming a water-tight joint.

About the shaft 7 adjacent the inner end of the bearing 5 is provided a collar 31 adapted to be secured to the shaft by means of a set screw 33.

In any suitable position on the shaft 7 and within the tank 1 is secured the rotor member of the pump, such member comprising a hub portion 35 encircling the shaft and secured thereto, by a thru pin 37 and a plurality of spaced-apart preferably curved vanes 39.

This rotor member is enclosed within a casing 41 which is rectangular in one direction, that is to say, in a direction parallel to the axis of the shaft 7 (see Fig. 1) and circular in another direction that is to say, transverse to said axis (see Fig. 2) whilst at one side this circular formation is broken into to provide a tangential or peripheral outlet 43, the walls 45 forming which are, at their outer ends, turned out at a right angle as shown at 47 and secured by means of bolts 49 to the tank wall, in which of course is provided a suitable opening 51 corresponding with the pump outlet just referred to. It will thus be seen that the casing is supported, solely by the walls of outlet 43, at a slight distance above the floor of the tank.

The opposite side walls 53 of the pump casing 41 are respectively provided with a centrally disposed opening 55 therein, preferably circular, and these openings are of such a size that the shaft 7 can freely pass therethrough and at the same time plenty of space is still left whereby the water in the tank can freely pass or fall into the interior of the casing 41 ready to be forced out of the tank by the vanes 39 through the outlet passageway 43 and opening 51 in the tank wall. Such openings 55 therefore form an axial intake for the pump.

Thus it will be seen that the casing 41 is absolutely independent and separate from the shaft 7 and the rotor member, and that it is supported solely in the tank by means of the connection hereinbefore described, namely, the outlet wall extensions 47 and bolts 49.

Now, as to the size of the vanes 39 with relation to the casing 41. This is important because in the case of dish washing machine the tank 1 will contain the rinsing water and this in turn will contain more or less solid matter washed from the dishes, such, for example, as pieces of bone. If therefore the vanes 39 are made of such a size as to closely fit the interior of the casing 41, damage is bound to result when such solid matter enters the casing as has frequently occurred in practice in pumps as ordinarily constructed.

Consequently, according to this invention, the vanes are made of such a size that they do not closely fit the interior of the casing; that is to say a clearance space is left between the interior of the side walls of the casing and the opposed edge of the vanes and between the outer ends of the vanes and the interior of the opposed end wall of the casing.

What I claim and desire to secure by Letters Patent is:—

1. In combination, a tank, a shaft journaled in opposite walls of said tank, a rotor on said shaft having a plurality of vanes, a pump casing surrounding said rotor to form therewith a centrifugal pump and spaced therefrom at all points to permit the passage therebetween of solid particles of substantial size, said casing being provided with lateral intake openings, and a tangential outlet member on said casing forming an outlet from the casing and from the tank, said outlet member being secured to a lower portion of a side wall of the tank to thereby support the casing above the floor of the tank.

2. In combination, a container for liquid, said container having an outlet port, a pump in said container, and a casing for said pump having an outlet portion fixed to a wall of the container at said outlet port to form the sole support for the casing.

In testimony whereof I have signed my name to this specification.

PATRICK HENRY DAVIS.